No. 677,166. Patented June 25, 1901.
E. L. ANRICH.
DOP.
(Application filed Nov. 9, 1900.)
(No Model.)
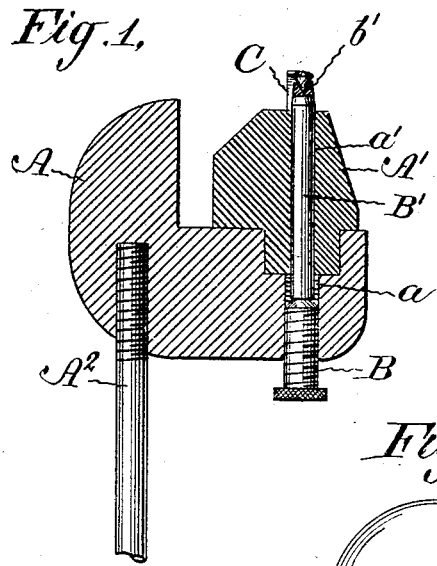
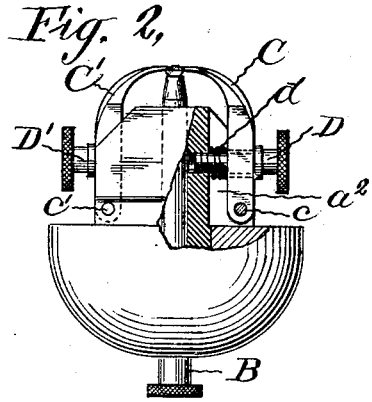
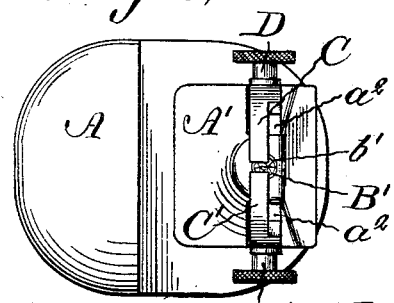
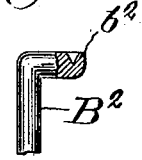
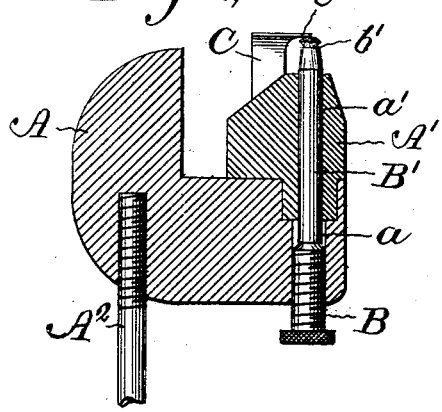
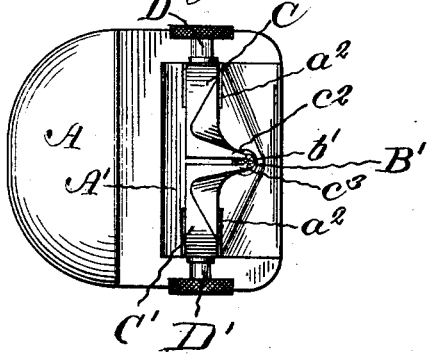
WITNESSES:
D. H. Rayment
Charles D. Jones.
INVENTOR
Emanuel L. Anrich,
BY
Edwin K. Brown.
HIS ATTORNEY

UNITED STATES PATENT OFFICE.

EMANUEL L. ANRICH, OF NEW YORK, N. Y.

DOP.

SPECIFICATION forming part of Letters Patent No. 677,166, dated June 25, 1901.

Application filed November 9, 1900. Serial No. 35,905. (No model.)

*To all whom it may concern:*

Be it known that I, EMANUEL LOUIS ANRICH, a citizen of the United States of America, and a resident of the borough of Manhattan, city, county, and State of New York, have invented a certain new and useful Improvement in Dops, of which the following is a full, clear, and exact description.

My improvement relates to a tool known as a "dop" for holding diamonds or other precious stones while being ground or polished.

I will describe my improvement in connection with the accompanying drawings, in which—

Figure 1 is a central vertical section, certain parts being shown in elevation. Fig. 2 is a front view, and Fig. 3 is a top view, of the device shown in Fig. 1. Fig. 4 is a vertical central section of a modification. Fig. 5 is a top view of the form shown in Fig. 4, and Fig. 6 is a form of supporting-pin which I may employ.

Similar letters of reference designate corresponding parts in all the figures.

A designates the body of the dop, and $A'$ a supporting head or piece set into said body in any suitable way. The body A receives the usual copper supporting-wire $A^2$. The body A is drilled, as shown at $a$, and the head $A'$ is drilled, as shown at $a'$, these two openings being concentric, the former being screw-threaded for a portion of its length to receive the screw B. Upon this screw B rests a pin $B'$, capable of adjustment by a set-screw in the opening $a'$ toward and from said fingers. The pin $B'$ is concaved on its upper end at $b'$ to provide a seat for the stone. The head $A'$ is recessed at $a^2$ on both sides of the center to receive the fingers or prongs C $C'$, which fingers are pivoted on studs $c$ and $c'$, respectively, set into the head. One of these recesses $a^2$ is shown in Fig. 2; but it is to be understood that a similar recess is on the opposite side of the head. The fingers C $C'$ are independently adjustable by means of screws D and $D'$, respectively, the said fingers being slotted, as shown in dotted lines, to receive the shanks of said screws and to permit the movement of the fingers on the pivots $c$ and $c'$. The said screws take into screw-threaded openings in the head $A'$. Springs are provided to bear between the head $A'$ and the fingers C and $C'$ to press the latter firmly against a collar on the shanks of the screws D and $D'$. In this instance I have shown a spiral spring $d$; but a flat spring may be employed.

The construction shown in Figs. 1, 2, and 3 is used for grinding or polishing off the corners, table, and culet of a diamond.

Figs. 4 and 5 show a modified form of construction, in which the fingers or prongs are bent and tapered at the ends $c^2$ $c^3$. This form is preferred by me for grinding or polishing small facets, as the fingers when in such form do not interfere with the work.

In Fig. 6 I have shown a pin $B^2$, having an eccentric concaved head $b^2$, which may be used with either form of dop above described when grinding or polishing the table and culet of a diamond to bring the stone central of the fingers.

To fit a stone in this tool, the pin $B'$ is lowered by lowering the screw B. The stone is then placed in the cavity of the pin and the fingers or prongs adjusted so as the leave the desired space between them necessary for the treatment of the stone. The screw B and the pin $B'$ are then raised to securely clamp the stone between the said pin and ends of the fingers or prongs. To turn the stone, the pin $B'$ is lowered, and after the stone is adjusted to proper working position the pin $B'$ is raised.

What I claim, and desire to secure by Letters Patent, is—

1. A dop comprising a body portion and a head, a supporting-pin for the stone passing through said head, clamping-fingers pivoted in said head, said pin and fingers being independently adjustable, substantially as described.

2. A dop comprising a body portion and a head, a supporting-pin for a stone passing through said head, clamping-fingers secured to said head and means to adjust said pin toward and from said fingers, substantially as described.

3. A dop comprising a body portion and a head, a support for the stone in said head, clamping-fingers pivoted in said head, said fingers being independently adjustable, substantially as described.

4. A stone-supporting pin for use in a dop consisting of a shank and a head eccentric thereof, substantially as described.

In testimony whereof I have signed my name to this specification in the presence of two subscribing witnesses.

EMANUEL L. ANRICH.

Witnesses:
GEO. E. CRUSE,
CHARLES S. JONES.